United States Patent
Warden et al.

(10) Patent No.: US 9,323,380 B2
(45) Date of Patent: Apr. 26, 2016

(54) ELECTRONIC DEVICE WITH TOUCH-SENSITIVE DISPLAY AND THREE-DIMENSIONAL GESTURE-DETECTION

(71) Applicant: RESEARCH IN MOTION LIMITED, Waterloo (CA)

(72) Inventors: James Paul Warden, Forth Worth, TX (US); Huanhuan Gu, Kitchener (CA); Arnold Sheynman, Northbrook (IL)

(73) Assignee: BlackBerry Limited, Waterloo (CA)

( * ) Notice: Subject to any disclaimer, the term of this patent is extended or adjusted under 35 U.S.C. 154(b) by 153 days.

(21) Appl. No.: 13/743,253

(22) Filed: Jan. 16, 2013

(65) Prior Publication Data

US 2014/0198058 A1   Jul. 17, 2014

(51) Int. Cl.
| | |
|---|---|
| G06F 3/041 | (2006.01) |
| G06F 3/046 | (2006.01) |
| G06F 3/0488 | (2013.01) |
| G06F 3/044 | (2006.01) |
| G06F 3/01 | (2006.01) |

(52) U.S. Cl.
CPC .............. *G06F 3/0416* (2013.01); *G06F 3/044* (2013.01); *G06F 3/046* (2013.01); *G06F 3/017* (2013.01); *G06F 3/0488* (2013.01); *G06F 2203/04101* (2013.01); *G06F 2203/04106* (2013.01)

(58) Field of Classification Search
CPC ..... G06F 3/0488; G06F 3/041; G06F 3/0412; G06F 3/04815; G06F 3/04855; G06F 3/046; G06F 3/042; G06F 3/0423; G06F 3/043; G06F 3/0436; G06F 3/044; G06F 3/047; G06K 9/00201; H04N 1/00381; H04N 13/0203; H04N 13/0253
USPC ................................ 345/173–174; 178/18.06
See application file for complete search history.

(56) References Cited

U.S. PATENT DOCUMENTS

| | | | |
|---|---|---|---|
| 4,907,001 A | 3/1990 | Harmuth | |
| 5,907,568 A | 5/1999 | Reitan, Jr. | |
| 6,204,804 B1 | 3/2001 | Andersson | |
| 6,281,599 B1 | 8/2001 | Murakami et al. | |
| 6,608,597 B1 | 8/2003 | Hadzoglou | |
| 6,771,208 B2 | 8/2004 | Lutter et al. | |
| 7,532,202 B2 | 5/2009 | Roberts | |
| 8,064,408 B2 * | 11/2011 | Woodsum | 370/334 |
| 8,077,074 B2 | 12/2011 | Venkatachalam et al. | |
| 8,194,049 B2 | 6/2012 | Oki | |
| 8,284,165 B2 * | 10/2012 | Koshiyama et al. | 345/173 |
| 8,600,462 B2 | 12/2013 | Kato | |
| 8,693,731 B2 | 4/2014 | Holz et al. | |
| 8,704,535 B2 * | 4/2014 | Chen et al. | 324/654 |

(Continued)

OTHER PUBLICATIONS

International Search Report and Written Opinion dated Oct. 22, 2013, issued from the corresponding International patent application No. PCT/US2013/021737.

*Primary Examiner* — Larry Sternbane
*Assistant Examiner* — Darlene M Ritchie
(74) *Attorney, Agent, or Firm* — Geoffrey Dekleine; Borden Ladner Gervais LLP

(57) ABSTRACT

A method includes utilizing transmitters and receivers, performing detection of objects spaced from an electronic device, when an object that is spaced from the electronic device is detected, continuing performing detection of objects, when no object is detected, discontinuing performing detection of objects, and utilizing touch sensors of the touch-sensitive display, performing touch detection.

19 Claims, 4 Drawing Sheets

(56) References Cited

U.S. PATENT DOCUMENTS

| | | |
|---|---|---|
| 8,902,597 B2 * | 12/2014 | Sato .............................. 361/749 |
| 2001/0014171 A1 | 8/2001 | Iijima et al. |
| 2004/0183788 A1 | 9/2004 | Kurashima et al. |
| 2006/0161871 A1 | 7/2006 | Hotelling et al. |
| 2006/0267953 A1 | 11/2006 | Peterson, Jr. et al. |
| 2008/0100572 A1 | 5/2008 | Boillot |
| 2008/0122803 A1 | 5/2008 | Izadi et al. |
| 2008/0143671 A1 | 6/2008 | Li |
| 2008/0231603 A1 | 9/2008 | Parkinson et al. |
| 2008/0238885 A1 | 10/2008 | Zachut et al. |
| 2009/0085881 A1 | 4/2009 | Keam |
| 2009/0227882 A1 | 9/2009 | Foo |
| 2010/0026470 A1 | 2/2010 | Wilson et al. |
| 2010/0177052 A1 | 7/2010 | Chang et al. |
| 2011/0063224 A1 | 3/2011 | Vexo et al. |
| 2011/0096024 A1 | 4/2011 | Kwak |
| 2011/0120784 A1 * | 5/2011 | Osoinach et al. .......... 178/18.06 |
| 2011/0205151 A1 | 8/2011 | Newton et al. |
| 2011/0216016 A1 | 9/2011 | Rosener |
| 2011/0267296 A1 * | 11/2011 | Noguchi et al. ............... 345/173 |
| 2011/0314425 A1 | 12/2011 | Chiang |
| 2012/0050180 A1 | 3/2012 | King et al. |
| 2012/0062514 A1 * | 3/2012 | Yu ................................ 345/174 |
| 2012/0086647 A1 | 4/2012 | Birkler |
| 2012/0092254 A1 | 4/2012 | Wong et al. |
| 2012/0092284 A1 | 4/2012 | Rofougaran et al. |
| 2012/0133597 A1 * | 5/2012 | Chen .............................. 345/173 |
| 2012/0169400 A1 | 7/2012 | Liu |
| 2013/0063370 A1 | 3/2013 | Lee et al. |
| 2013/0084984 A1 | 4/2013 | Gagner et al. |
| 2013/0187863 A1 * | 7/2013 | Rydenhag et al. ............. 345/173 |
| 2013/0208948 A1 | 8/2013 | Berkovich at al |
| 2013/0229499 A1 | 9/2013 | Zhao et al. |
| 2013/0285972 A1 * | 10/2013 | Elias et al. ..................... 345/174 |
| 2014/0106684 A1 * | 4/2014 | Burns et al. ..................... 455/78 |
| 2014/0160054 A1 | 6/2014 | Rabii et al. |

\* cited by examiner

ELECTRONIC DEVICE WITH TOUCH-SENSITIVE DISPLAY AND THREE-DIMENSIONAL GESTURE-DETECTION

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
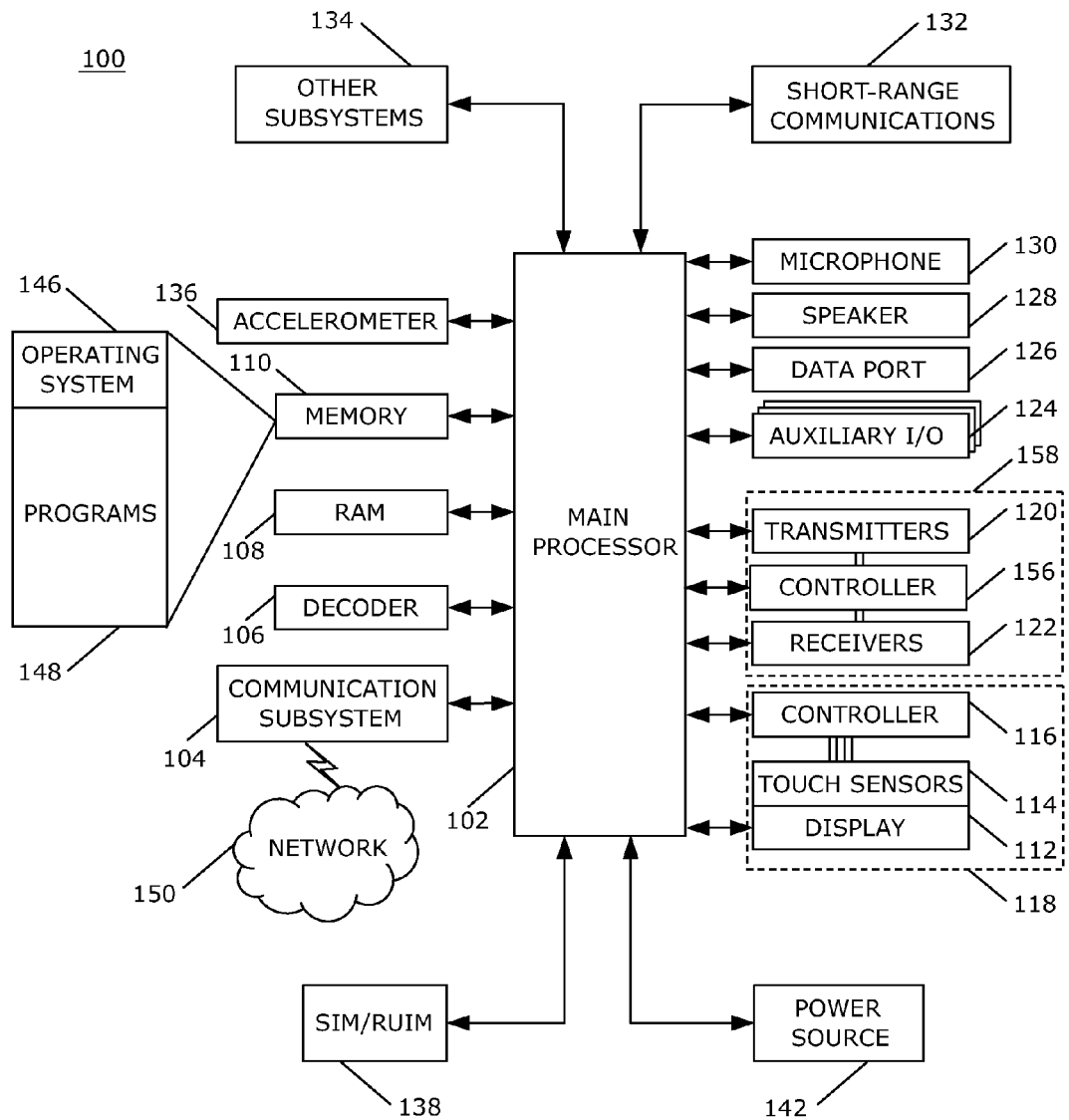
FIG. 1 is a block diagram of an electronic device in accordance with the disclosure.

The following describes an electronic device and a method that includes, performing touch detection utilizing transmitters and receivers of an electronic device. When no touch is detected, three-dimensional (3D) gesture detection is performed to detect gestures performed by objects spaced from the electronic device. When a 3D gesture is not detected, performing 3D gesture detection is discontinued to reduce the effect of noise caused by the transmitters during touch detection.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without wireless communication capabilities, such as handheld electronic games, digital photograph albums, digital cameras, media players, e-book readers, and so forth. Examples of non-portable electronic devices include desktop computers, electronic white boards, smart boards utilized for collaboration, built-in monitors or displays in furniture or appliances, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a 3D gesture detector 158, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. The three-dimensional gesture detector 158 includes transmitters 120 and receivers 122 that are coupled to a controller 156. Input via a graphical user interface is provided via the touch-sensitive display 118 and the 3D gesture detector 158. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more touch gestures may also be detected by the touch-sensitive display 118. A touch gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The transmitters 120 and the receivers 122 of the 3D gesture detector 158 may be disposed on the touch-sensitive display 118. Alternatively, the 3D gesture detector 158 may include antennae that are operable to transmit and to receive signals. The transmitters 120 and the receivers 120 may comprise any suitable material, such as ITO. The transmitters 120 and the receivers 120 may be disposed on the same layer or layers as the capacitive touch sensors 114, disposed on another layer or layers of the touch-sensitive display 118, disposed on a cover of the touch-sensitive display 118, disposed on a housing of the electronic device 100, disposed on or included as a separate element, and so forth.

Figure 3:
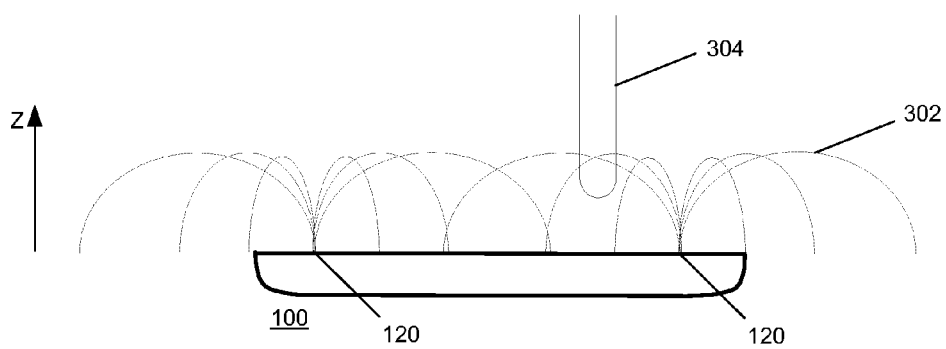
FIG. 3 is a side view of an electronic device in accordance with the disclosure.

The 3D gesture detector 158 detects one or more objects that are spaced away from the electronic device 100, for example, spaced from the touch-sensitive display 118. Movement of the one or more objects may be considered a 3D gesture. A 3D gesture includes a gesture performed by an object that is typically spaced from the touch-sensitive display 118. The object may not touch the touch-sensitive display 118. At least one of an origin, an end point, and a part of the path of the 3D gesture is spaced from the electronic device 100. The controller 156 or the processor 102 may determine attributes of the 3D gesture, such as an origin, an end, the distance travelled, the duration, the velocity, the direction, the number of objects performing the gesture, and so forth. Location data including the origin and the end may include data for a location of the object or the location of a single point on the object. The location of a detected object may include x, and y components, e.g., horizontal, vertical components, respectively, with respect to a user's view of the touch-sensitive display 118. The location may also include a z component, e.g., a component along an axis extending away from the electronic device 100, for example, an axis perpendicular to the touch-sensitive display 118, such as shown in FIG. 3. A 3D gesture may be identified by the detected attributes of the gesture. The 3D gesture may be associated with or mapped to a function that is performed.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or may be distinct or separate touch sensors from the touch sensors in the display area. A touch, including a gesture, may be associated with the display area, the non-display area, or both areas. The touch sensors may extend across substantially the entire non-display area or may be disposed in only part of the non-display area. Transmitters and receivers may also be disposed partially or entirely within the non-display area.

Figure 2:
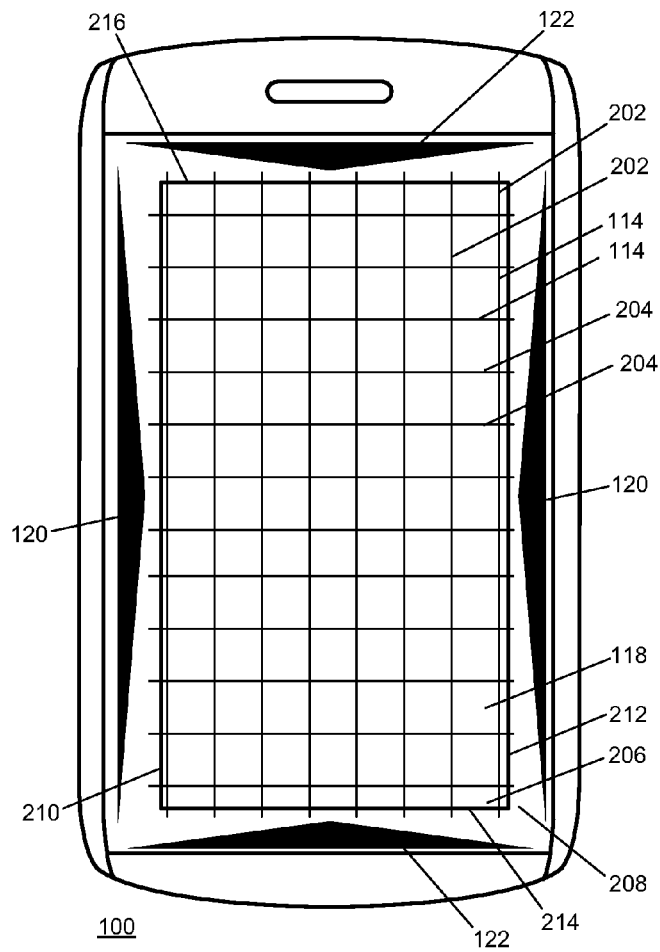
FIG. 2 is a front view of an electronic device in accordance with the disclosure.

A front view of an electronic device 100 is shown in FIG. 2. Two sets of touch sensors 114, also referred to as touch-sensing electrodes, are illustrated in the example of FIG. 2. The touch sensors 114 are shown for the purpose of illustration, but are not visible to the eye when looking at the front view of the electronic device 100. Transmitters 120 and receivers 122 are also illustrated in the example of FIG. 2. As with the touch-sensors 114, the transmitters 120 and receivers 122 are shown for the purpose of illustration, but are not visible to the eye when looking at the front view of the electronic device 100.

The touch sensors 114 include drive electrodes 202 that extend generally vertically in the view illustrated in FIG. 2. The drive electrodes 202 may be disposed, for example, on a substrate, on a cover, or on any other suitable layer of the touch-sensitive display 118. The touch sensors 114 also include sense electrodes 204 that extend generally horizontally in the view illustrated in FIG. 2. The drive electrodes 202 are spaced from the sense electrodes 204 by an interlayer dielectric or insulator. The terms "vertically" and "horizontally" are utilized herein to provide reference to an orientation of the electronic device 100 in the drawings and are not otherwise limiting.

The drive electrodes 202 and the sense electrodes 204 are coupled to the controller 116 and are utilized, for example, for mutual capacitive touch sensing. The controller 116 is configured to drive the drive electrodes 202 while measuring changes in voltage across the sense electrodes 204, also referred to as receiving signals and measuring signal values from the sense electrodes 204. The change in voltage across the sense electrodes 204, or change in signal value, is a result of change in capacitance.

In the example of FIG. 2, the electronic device 100 includes two transmitters 120 and two receivers 122 that are generally triangularly shaped. Transmitters and receivers having other shapes may be successfully implemented. The transmitters 120 are disposed in the non-display area 208 near opposite edges or sides 210, 212 of the display area 206. In this example, the receivers 122 are disposed in the non-display area 208 near opposite edges or sides 214, 216 of the display area 206. The edges or sides 214, 216 extend from the edge or side 210 to the edge or side 212.

A side view of the electronic device 100 is illustrated in FIG. 3. In the example of FIG. 3, signals are emitted from the transmitters 120 to generate the electric field illustrated by the dashed lines 302. The controller 156 controls the transmitters 120 and the receivers 122. Under the control of the controller 156, the transmitters 120 emit signals, for example, in the 30 to 300 kHz range, such that an electric field 302 is formed by the transmitters 120. For example, the transmitters 120 may emit signals at 156 kHz. Signals of other frequencies may be successfully implemented, and the frequency utilized may depend on the controller utilized. When an object 304 is present in the electric field 302, the object 304 interferes with the electric field 302, changing the electric field 302 at the receivers 122. The charge that is induced on the receivers 122 is also affected by the object in the electric field. Thus, the receivers 122 are utilized to detect an object that is spaced from electronic device 100, such as spaced from the touch-sensitive display 118, by measuring change in the induced charge.

An object 304 that is spaced from the electronic device 100 is detected based on changes in the induced charge on the receivers 122 when the object enters the electric field compared to the induced charge on the receivers 122 when no object is present.

3D gestures are detected based on the changes in the induced charge when the object 304 moves. When the object 304 moves relative to the receivers 122, and affects the induced charge. Thus, the induced charge on the receivers 122 changes. The changes in induced charges on the receivers 122 are measured. Movement of the object 304 is detected, for example, based on calculations utilizing the measured changes in induced charge.

Detection of 3D gestures and gestures on the touch-sensitive display 118 are detectable by the electronic device 100. The emission of signals by the transmitters 120 may cause noise that interferes with the touch sensors 114.

Figure 4:
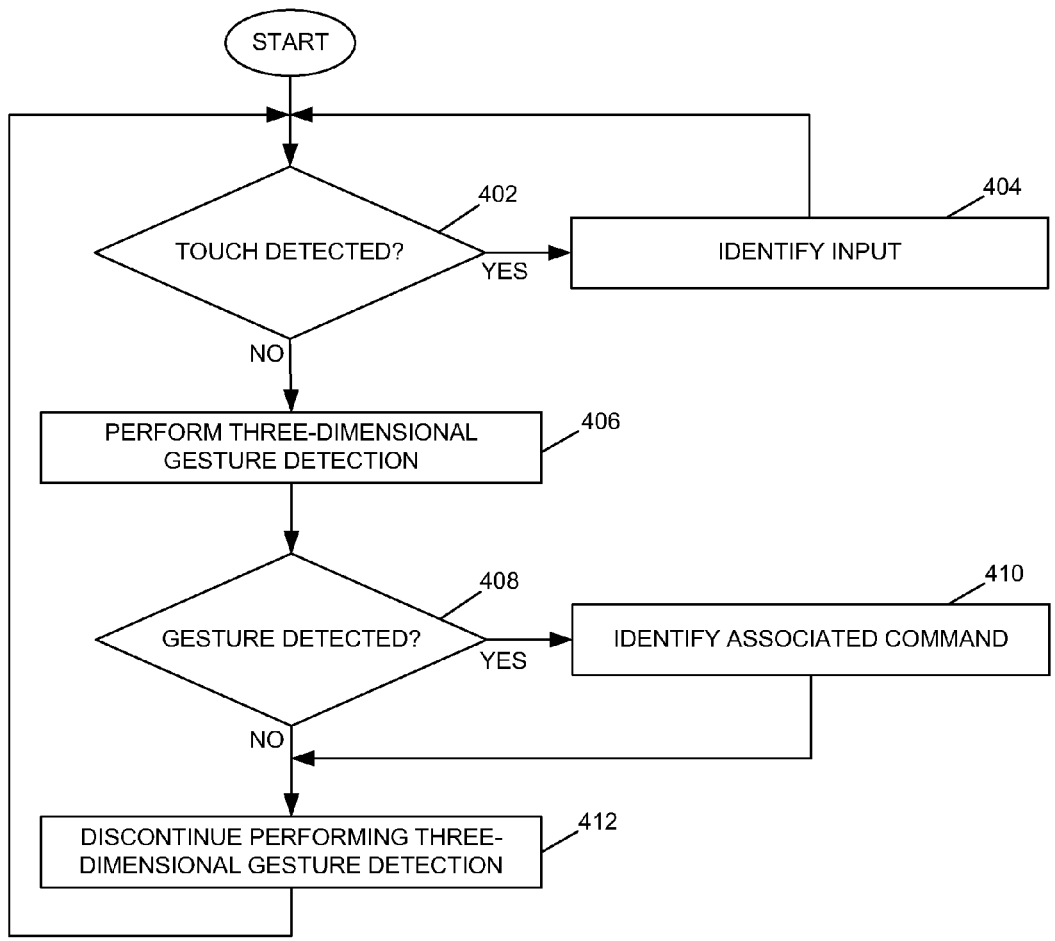
FIG. 4 is a flowchart illustrating a method of detecting objects spaced from a touch-sensitive display and detecting touches on the touch-sensitive display in accordance with the disclosure.

A flowchart illustrating a method of detecting objects spaced from the electronic device 100 and detecting touches on the touch-sensitive display 118 is illustrated in FIG. 4. The method may be carried out by software executed, for example, by the controller 116, the controller 156, and the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the electronic device to perform the method may be stored in a computer-readable storage medium device or apparatus, which may be a non-transitory or tangible storage medium.

When a touch is detected 402 on the touch-sensitive display 118, the touch attributes are detected, including touch location to identify 404 the input. When an input is identified, the associated command is identified. Touch detection may be performed continuously while the electronic device is turned on, while the electronic device is operating at full power or is not in a sleep or low power condition. Touch detection may continue while performing 3D gesture detection.

Performing touch detection continues, and when a touch is detected, 3D gesture detection is not performed. Performing 3D gesture detection may also be delayed for a period of time after a touch is detected. Thus, when a touch ends, 3D gesture detection may not be performed for a period of time after the touch ends and no further touch is detected, such as a fraction of a second, e.g., 0.5 seconds or other suitable period of time.

When a touch is not detected 402, e.g., for a predetermined period of time such as 0.5 seconds or another suitable period of time, 3D gesture detection is performed 406. When a 3D gesture is detected 408, the attributes of the gesture are utilized to identify 410 the 3D gesture and the associated command. For example, a gesture may be associated with a command utilizing a look-up table. Any suitable command may be associated with the gesture. For example, commands may be utilized to open or launch an application, to close an application, to proceed to a next photo or image, to reverse back to a previous image, to scroll, to zoom, and so forth. After identifying the associated command 410, the process continues at 412. Alternatively, the process may continue at 408 after identifying the associated command 410.

When a 3D gesture is not detected 408, performance of 3D gesture detection is discontinued 412. A 3D gesture is not detected, for example, when an object is not located in front of the electronic device 100 or when an object does not move relative to the transmitters 120 and the receivers 122. After 412, touch detection is performed on the touch-sensitive display 118. Touch detection is performed by driving the drive electrodes 202 while sensing utilizing the sense electrodes 204. The transmitters 120 do not emit signals when performing touch detection at 402.

In the example of FIG. 4, touch detection begins and continues until no touch is detected. Alternatively, the process may begin with 3D gesture detection and 3D gesture detection may be discontinued when a touch is detected. Thus, 3D gesture detection may be performed until a touch is detected. In this example, touch detection is prioritized such that 3D gesture detection is discontinued to increase accuracy of touch detection when a touch occurs. When a touch is no longer detected, 3D gesture detection is performed.

Figure 5:
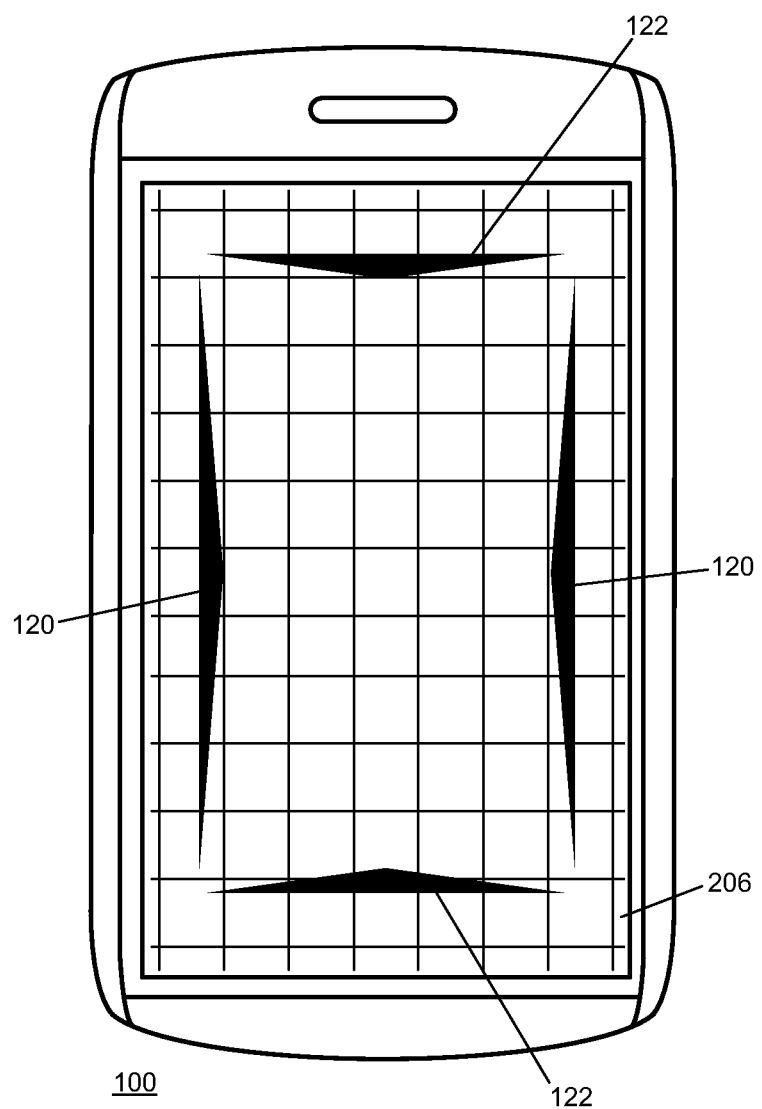
FIG. 5 is a front view of another example of an electronic device in accordance with the disclosure.

A front view of another electronic device 100 is shown in FIG. 5. In the example of FIG. 5, the transmitters 120 and receivers 122 are disposed in the display area 206. As indicated above, the transmitters and the receivers may be any other suitable shape. Other numbers of transmitters and receivers may also be successfully implemented. For example, the electronic device may include an array of transmitters and receivers. Touch detection may be performed continuously such that touch detection is performed during 3D gesture detection as described. Alternatively, touch detection may be turned off during 3D gesture detection to reduce power consumption and interference during 3D gesture detection.

A method comprises performing touch detection utilizing touch sensors of a touch-sensitive display of an electronic device. While no touch is detected on the touch-sensitive display, for example, for a predetermined period of time, 3D gesture detection that detects gestures spaced from an electronic device utilizing transmitters and receivers is performed. Touch detection may be performed while performing 3D gesture detection. 3D gesture detection may not be performed again until no touch is detected on the touch-sensitive display, for example, when no touch is detected for a predetermined period of time, such as 0.5 second, 1 second, 2 seconds, or other suitable period of time.

Alternatively, a method comprises performing 3D gesture detection that detects gestures spaced from an electronic device utilizing transmitters and receivers of an electronic device. While no 3D gesture is detected, for example, for a predetermined period of time, touch detection utilizing touch sensors of a touch-sensitive display is performed. Touch detection may be performed while performing 3D gesture detection. Touch detection may not be performed again until no 3D gesture is detected, for example, when no 3D gesture is detected for a predetermined period of time, such as 0.5 second, 1 second, 2 seconds, or other suitable period of time.

The transmitters of the 3D gesture detector are not utilized to transmit signals during touch detection to reduce the effect of noise on the signals received from the sense electrodes. Noise during touch detection is reduced, increasing accuracy of touch detection. Thus, 3D gesture detection and touch detection may both be performed without 3D gesture detection interfering with touch detection.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   utilizing touch sensors extending across a display area of a touch-sensitive display that includes the display area in which information is displayable and a non-display area in which information is not displayable, performing touch detection to detect touches on the display area;
   when a touch is detected utilizing the touch sensors, continuing performing touch detection utilizing the touch sensors;
   when no touch is detected utilizing the touch sensors:
   performing three-dimensional gesture detection to detect gestures spaced from the electronic device utilizing transmitters and receivers disposed in the non-display area of the touch-sensitive display, wherein the transmitters and receivers are separate from the touch sensors and the transmitters extend near opposing sides of the display area and the receivers extend near opposing sides of the display area such that a first one of the transmitters extends near and along a length of a first side of the display area, a second one of the transmitters extends near and along a length of a second side of the display area, a first one of the receivers extends near and along a length of a third side of the display area and a second one of the receivers extends near and along a length of a fourth side of the display area, wherein the transmitters emit signals in a range of from 30 KHz to 300 KHz when performing three-dimensional gesture detection;
   discontinuing performing three-dimensional gesture detection in response to detecting a touch utilizing the touch sensors such that the transmitters and receivers are not utilized during touch detection utilizing the touch sensors.

2. The method according to claim 1, wherein three-dimensional gesture detection is performed when no touch is detected for a threshold time period.

3. The method according to claim 1, comprising discontinuing performing three-dimensional object detection when no three-dimensional gesture is detected.

4. The method according to claim 1, comprising discontinuing performing three-dimensional object detection after a three-dimensional gesture is detected.

5. The method according to claim 1, wherein performing three-dimensional gesture detection comprises detecting movement of objects that are spaced from the electronic device.

6. The method according to claim 1, wherein an object is detected when the object moves relative to the transmitters and the receivers.

7. The method according to claim 1, wherein performing three-dimensional gesture detection comprises:
   emitting the signals from the transmitters and measuring induced charge on the receivers;
   utilizing changes in the induced charge to detect the three-dimensional gesture.

8. A non-transitory computer-readable storage device having computer-readable code stored thereon, the computer-readable code executable by at least one processor of the electronic device to perform the method of claim 1.

9. The method according to claim 1, wherein the first one of the transmitters extends substantially an entire length of the first side, the second one of the transmitters extends substantially an entire length of the second side, the first one of the receivers extends substantially an entire length of the third side, and the second one of the receivers extends substantially an entire length of the fourth side.

10. The method according to claim 1, wherein the first one of the transmitters, the second one of the transmitters, the first one of the receivers, and the second one of the receivers are each generally triangularly shaped.

11. An electronic device comprising:
   a touch-sensitive display comprising a display area in which information is displayable and a non-display area in which information is not displayable, the touch-sensitive display including touch sensors disposed in the display area to perform touch detection to detect touches on the display area and to continue performing touch detection in response to detecting a touch;
   transmitters and receivers arranged and constructed to perform three-dimensional gesture detection of objects spaced from the electronic device when no touch is detected utilizing the touch sensors and to discontinue performing three-dimensional gesture detection in response to detecting a touch utilizing the touch sensors such that the transmitters and receivers are not utilized during touch detection utilizing the touch sensors;
   wherein the transmitters and receivers are disposed in the non-display area and are separate from the touch sensors and, wherein the transmitters extend near opposing sides of the display area and the receivers extend near opposing sides of the display area such that a first one of the transmitters extends near and along a length of a first side of the display area, a second one of the transmitters extends near and along a length of a second side of the display area, a first one of the receivers extends near and along a length of a third side of the display area and a second one of the receivers extends near and along a length of a fourth side of the display area, wherein the transmitters emit signals in a range of from 30 KHz to 300 KHz when performing three-dimensional gesture detection.

12. The electronic device according to claim 11, wherein an object is detected when the object moves relative to the transmitters and the receivers.

13. The electronic device according to claim 11, comprising a processor coupled to the transmitters and receivers to detect movement of the objects spaced from the display based on changes in induced charge on the receivers.

14. The electronic device according to claim 11, wherein the transmitters and receivers are controlled by a controller to continue to perform three-dimensional gesture detection until a touch is detected.

15. The electronic device according to claim 11, wherein the transmitters and receivers are controlled by a controller such that three-dimensional gesture detection is not performed again until no touch is detected on the touch-sensitive display.

16. The electronic device according to claim 11, wherein the transmitters and receivers are controlled by a controller such that three-dimensional gesture detection is not performed until no touch is detected on the touch-sensitive display for a threshold time period.

17. The electronic device according to claim 11, wherein three-dimensional gesture detection is performed by:
    emitting signals from the transmitters and measuring induced charge on the receivers;
    utilizing changes in the induced charge to detect the three-dimensional gesture.

18. The electronic device according to claim 11, wherein the first one of the transmitters extends substantially an entire length of the first side, the second one of the transmitters extends substantially an entire length of the second side, the first one of the receivers extends substantially an entire length of the third side, and the second one of the receivers extends substantially an entire length of the fourth side.

19. The electronic device according to claim 11, wherein the first one of the transmitters, the second one of the transmitters, the first one of the receivers, and the second one of the receivers are each generally triangularly shaped.

* * * * *